United States Patent Office 2,787,576
Patented Apr. 2, 1957

1

2,787,576

ATTENUATING B. ABORTUS AND P. MULTOCIDA

James C. Kakavas and Katherine E. Yaw, Newark, Del., assignors to University of Delaware Research Foundation, Newark, Del., a corporation of Delaware No Drawing. Application October 22, 1953, Serial No. 387,791

5 Claims. (Cl. 167—78)

Our present invention relates to the modification or adaptation of microorganisms. More particularly, it concerns a method of attenuating, i. e. reducing the virulence of, virulent strains of microorganisms, such as bacteria, particularly those of the families Parvobacteriaceae and Enterobacteriaceae without destroying their immunizing properties.

The families Parvobacteriaceae and Enterobacteriacae include many species of bacteria, some of which are distinguished by their virulence when present in the animal body. Such bacteria are the cause of serious infections, many of which are very difficult, if not impossible, to cure. Considerable attention has therefore been devoted to the possibility of immunizing the animal host by the injection of a strain (either living or dead) having reduced virulence, which will result in the formation of antibodies effective against the virulent strains. Such immunizing strains are distinct from the virulent strains and can be cultured indefinitely in the usual media without becoming dangerously virulent. However, it is generally difficult to find satisfactory immunizing strains, and often their antigenic structure is disadvantageous, as will be explained more fully hereinafter.

We have found that it is possible rapidly to modify the characteristics of virulent strains of microorganisms, particularly bacteria, in the desired direction by adapting the microorganisms to growth in media containing substantially bacteriostatic concentrations of the D-forms of one or more of the various amino acids utilized or formed by living organisms in the synthesis of proteins. Such amino acids will hereinafter sometimes be referred to as protein forming amino acids. Such adaptation is achieved by repeatedly sub-culturing the originally virulent strains in media containing initially less than toxic concentrations of said D-amino acids, but sufficient substantially to inhibit the growth of said virulent strains, until these microorganisms are so modified as to exhibit substantially normal growth in such media. Preferably the concentration of the D-amino acid used is gradually increased during the sub-culturing of the microorganism to a point at which it would completely inhibit the growth of or even be bactericidal with respect to the original virulent strain. The result of such adaptation is a modification of the strain which in many cases is temporary only, as may be demonstrated by the fact that the modified strain will revert to its original unadapted status upon repeated sub-culturing in the absence of the D-amino acids.

Surprisingly the adaptation of virulent strains of microorganisms to growth in the presence of what would normally be growth inhibiting concentrations of the D-forms of the protein forming amino acids results in an attenuation of their virulence without destroying their ability to produce antibodies in the animal host, that are effective against the original virulent strains. Hence, the modified strains possess highly desirable immunizing properties. At the same time the antigenic structures of the modified strains are frequently changed in a highly desirable manner. It is advisable to continue cultivation of the modified

2 strains in the presence of the D-amino acids, otherwise they may revert to their original virulent forms.

The particular protein forming amino acids whose unnatural dextro rotary forms have been found to be effective for the purposes of our invention have been described in an article by W. C. Rose in Science, vol. 86 (1937), pages 298–300. They include threonine, valine, leucine, isoleucine. phenylalanine, methionine, tryptophane, lysine, histidine and arginine. One may also employ the racemic forms of the protein forming amino acids, but it appears that the desired effects are due entirely to their contents of the D-forms. Hence, we prefer to utilize only the D-forms when these are readily available. By reason of their accesibility we prefer to use D-valine, D-leucine and D L-methionine, all of which have given excellent results. Obviously such amino acids may be used in combination, as well as individually.

The Parvobacetriaceae and Enterobacteriaceae whose virulent strains may be modified in accordance with our invention, include many genera of which the Brucella, Pasteurella and Salmonella deserve particular mention. Said genera include numerous well known highly virulent strains. One of the most important and best known species within the genera Brucella is the *Brucella abortus,* which is responsible for the widespread disease known as Bang's disease or brucellosis in cattle. Much of our work was done with the strain of *Brucella abortus* obtained from the U. S. B. A. I. and designated as strain 19. This strain is used widely in calfhood vaccination for the control of brucellosis Another strain which is designated as 2308 and which has greater virulence than the former, was obtained from the same source and was used in this study. Both of these strains are extremely virulent for chick embryos, a single organism being sufficient to kill the infected embryo.

Another well known virulent strain successfully modified according to our invention is a member of the Pasteurella genus known as *Pasteurella multocida* (strain avicida), which is obtained from infected chickens. The strain is highly virulent for chickens, mice, guinea pigs and rabbits. It is responsible for the disease known as chicken cholera. Additional strains suitable for modification by our new method are microorganisms of the Enterobacteriaceae family such as *Escherichia coli, Salmonella gallinarum, Salmonella pullorum* and *Salmonella typhosa.* In our investigations of virulent strains of Parobacteriaceae and Enterobacteriaceae, and particularly those of the genera Brucella, Pasteurella and Salmonella, all have shown substantial reduction in virulence (attenuation), when subjected to our process of modification.

We have shown that our D-valine attenuated strains of *Brucella abortus* and *Pasteurella multocida* are effective in veterinary vaccines. However, it has not yet been demonstrated that our method will produce attenuated strains of microorganisms that are effective in vaccines for human therapy.

The concentrations of the D-forms of protein forming amino acids required in our process will vary widely, depending upon the particular amino acid and particular strain of microorganism employed. It is, however, a simple matter to determine in each case the maximum concentration of the selected D-amino acid that will almost but not quite completely inhibit growth of the selected strain of microorganism. Such concentration is added to standard culture media, such as sterile Albimi broth, Difco tryptose broth, nutrient broth and the like. It will delay the growth of the microorganism, but should not be enough to suppress such growth entirely. After several days, when growth is evident, a sub-culture is made in a medium having the same concentration of the D-amino acid, whereupon it will be noted that the growth of the sub-culture is more rapid. After repeated transfers, it will be found that the microorganism has adapted itself to the medium and grows rapidly. It may then be subcultured in a medium having a higher concentration of the D-amino acid and the entire procedure repeated with such higher concentration. If desired, such procedure may again be repeated with still a higher concentration. In this manner the microorganism adapts itself to substantially normal growth in concentrations of the D-amino acid that would be toxic to the original unmodified microorganism, or at least completely inhibit its growth. Generally from about five to about fifty transfers will accomplish the desired adaptation. If subculturing of the adapted microorganism is continued in a culture medium that is lacking in the D-amino acid, it may revert to the original virulent type.

The optimum culture conditions, i. e. temperature, duration and number of transfers required, will likewise vary within wide limits, but may readily be established. The same is true of the degree of adaptation required in order to reduce the virulence of the original strain to a point where it may be employed with safety for immunizing purposes. These are all details that can safely be left to the skill of a trained bacteriologist, particularly in view of the detailed examples given below for purposes of illustrating how our invention may be carried out in practice. Our invention is of course not in any way limited to the details given in such examples, but includes within its scope all variations and modifications obvious from the foregoing general description, unless expressly excluded by the language of the appended claims.

Example 1

Strains Nos. 19 and 2308 of *Brucella abortus* obtained from the U. S. Bureau of Animal Industry were modified by cultivation in D-amino acid containing media as follows:

The basic medium employed throughout was a sterile Albimi broth containing 2% "M" peptone, 0.1% glucose, 0.2% yeast autolysate, 0.5% sodium chloride and 0.01% sodium bisulfate. To such medium were added varying amounts of D-valine in the form of an 0.1 molar solution. Said solution was sterilized and added aseptically to the broth to give the desired concentrations of the D-amino acid.

The initial inoculations were made in Albimi broth containing 0.025M of D-valine. Apparent growth developed in five days in the D-valine broth, whereas in the control tube growth was optimum. At the end of five days incubation, sub-culture was made into 0.025M D-valine broth and at the end of five days incubation there was growth slightly greater than that in the first sub-culture. The third transfer was made in Albimi broth containing 0.05M D-valine. The growth appeared to be delayed in the increased concentration of D-valine and it required seven days for visible growth. Transfers were made at weekly intervals in 0.05M D-valine broth. As the sub-cultures increased in number, there was an acceleration of growth rate and a change in the type of growth. The culture became stringy and mucoid. Adaptation to grow in the D-valine will occur both at 37° C. and at 30° C. incubation; however, at 30° C. incubation adaptation occurs faster. After 15 to 20 sub-cultures the organisms became well adapted, although the rate of growth in D-valine was approximately 60 percent of the control tube.

The modified *Brucella abortus* strains Nos. 19 and 2308 obtained in this manner were then tested to determine their virulence. The tests were made on chick embryos, because it was found that a single organism of the original strains will suffice to kill the infected embryo. It was found that the modified strains had almost completely lost their virulence. An inoculation of more than 10,000 bacteria per chick embryo caused no deaths beyond the normal anticipated deaths at the end of ten days incubation. With an inoculum of more than 1,000,000 organisms per chick embryo, only 50 percent of the chicks died.

In the course of the foregoing tests a very interesting and important observation was made with respect to the antigenic structure of the modified *Brucella abortus* No. 19. This strain has the disadvantage, when used in the vaccination of cattle, that many vaccinated animals will long retain antibodies in their blood stream, that will give a positive reaction to the customary agglutination test used to diagnose Brucella infections, although there is no danger that such vaccinated cattle will spread infection to others. There is no method known at present to distinguish between the antibodies arising from strain 19 and those from virulent Brucella involving a real danger of spreading infection. In other words, many vaccinated cattle will continue for years thereafter to give a positive reaction to the standard test for a Brucella infection, thus greatly lessening their value and that of the entire herd of which they are members.

The *Brucella abortus* strain No. 19 modified as described above showed the remarkable advantage that the agglutinating antibodies engendered thereby are not demonstrable by the standard agglutination test some three to four weeks after the last injection and thereafter. It is thus possible with our modified strain to produce effective vaccination without the danger that the vaccinated animals will for many years thereafter give a positive test for the standard diagnosis of Brucella infections. This is of great economic significance to the dairyman.

Example 2

In the following experiments a strain of *Pasteurella multocida*, known as *Pasteurella avicida*, was used. This strain was originally obtained from the stock culture collection of the Department of Biological Sciences of the University of Delaware at Newark, Delaware, where it had been maintained in Difco stock culture agar for more than one year. It is very pathogenic for mice, and can be isolated readily from the heart, liver and spleen of the autopsied test animals.

Throughout the experiments described below all subcultures were grown in the sterile Albimi broth described in Example 1. The broth was made up in double strength and sterilized. The protein forming amino acid solutions used were likewise all made up double strength and added to the broth aseptically to give the desired final concentrations of broth and amino acid solutions. The D and L-forms of the amino acids in the broth had a final concentration of 0.05M, and the racemic mixture a final concentration of 0.1M. In starting a training series of *Pasteurella avicida*, the original inoculum was 0.05 ml of a 24-hour broth culture introduced into approximately 10 ml of the above medium. Early in the work the inoculated broth was incubated at 37°, but later the cultures were left at room temperature, 25° to 30° C.

The original inoculum, as described above, was added to a tube of broth, broth plus L-valine 0.05M, and broth plus D-valine 0.05M. After 24 hours incubation, there was a good growth in broth and broth plus L-valine, but there was no apparent growth in the broth containing D-valine. After 48 hours some growth was present in the D-valine broth (about 5% of that of the broth control) and a 0.1 ml. sub-culture was made to another tube of broth containing D-valine. A sub-culture was made at the same time from the tube of broth to another tube of broth. No further work was done with the L-valine at the time, since it showed no inhibition of *Pasteurella avicida*.

Sub-culturings every two or three days from broth to broth and from D-valine broth to D-valine broth were continued. After 15–20 sub-cultures, the bacteria in the D-valine broth were tested for their ability to grow in the D-valine containing broth compared with their ability to grow in the broth alone. In general, the modified organisms would grow as well in the broth containing D-valine as in the broth alone. These strains were completely trained or adapted to grow in broth plus D-valine, a medium which was initially very inhibitory to them. The adapted strain was then compared with the control strain for virulence in mice. Such comparison established that the adapted strain had lost virulence. While the control strain was still able to kill all the mice tested when less than 10 bacteria were injected, as many as 1,300,000 bacteria of the adapted strain could be injected intraperitoneally without fatal effect upon the test mice. Similar tests were made on guinea pigs and rabbits, which demonstrated that the adapted strain was also avirulent for them, whereas the control strain killed in 24 to 48 hours.

The avirulent, adapted strain was then tested for its protective power for mice against the original virulent strain of the same bacterium. It was demonstrated that the avirulent strain gave good protection. The immunized mice when autopsied three weeks after injection of normally fatal doses of the virulent strain showed no such bacteria in the heart, liver or spleen. Similar experiments using a killed vaccine of the adapted strain showed that such killed vaccine is much less efficient than the living attenuated vaccine. In further tests effective immunization of ten-day old chicks was accomplished by injection of the adapted strain.

D L-methionine and D-leucine were also used as described above, and the same responses were observed as regards training (adaptation) and toxic effects of the microorganism.

We claim:

1. A method for attenuating a virulent strain of a microorganism selected from the Brucella abortus and Pasteurella multocida species without destroying its immunizing properties, which comprises repeatedly subculturing said strain in media each containing a concentration of D-valine at least sufficient almost completely to inhibit growth of the original strain, and repeating such subculturing at least five times and until the subcultured organism has become adapted to substantially normal growth in one of the aforesaid media.

2. A method as claimed in claim 1, wherein the subculturing media each contain a concentration of at least 0.025M of the D-valine.

3. A method as claimed in claim 2, wherein the D-valine concentrations of the subculturing media employed are gradually increased during the subculturing, until they reach levels that are toxic to the original strain of microorganism.

4. A method as claimed in claim 3, wherein the strain of microorganism employed is a strain of *Brucella abortus*.

5. A method as claimed in claim 3, wherein the strain of microorganism employed is a strain of *Pasteurella multocida*.

References Cited in the file of this patent

Porter: Bacterial Chem. and Physiology, pp. 704–706.
Huddleson: Brucellosis in Man and Animals, 1943, p. 9.
Annual Review of Microbiology, vol. 6, 1952, pp. 36–39.
Tanner: Bacteriology, 3rd ed., 1938, John Wiley and Sons, Inc. New York, p. 396.
Porter: Bacterial Chem. and Physiology, 1946, John Wiley and Sons, Inc., pp. 681, 702 and 703.
Annual Review of Microbiology, vol. 1, 1947, pp. 264, 265.
Rubini et al.: Proc. Soc. Exptl. Biol. and Med., vol. 76, No. 4, April 1951, pp. 662–665.
Brown et al.: Proc. Soc. Exptl. Biol. and Med., vol. 76, No. 4, June 1951, pp. 367, 369.